Dec. 23, 1958  J. G. PERNOLLET ET AL  2,865,213
CHANGE SPEED DEVICES
Filed May 17, 1955  5 Sheets-Sheet 4
*Fig. 4.*
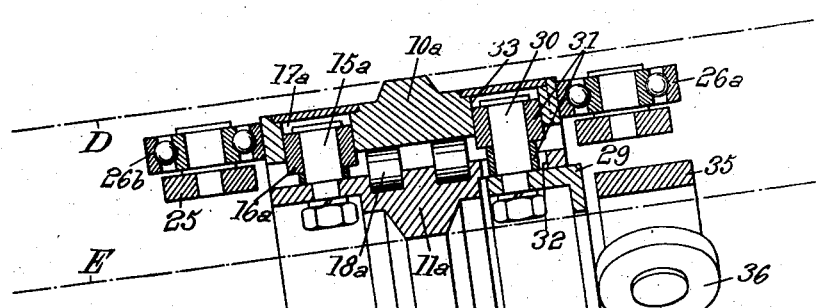
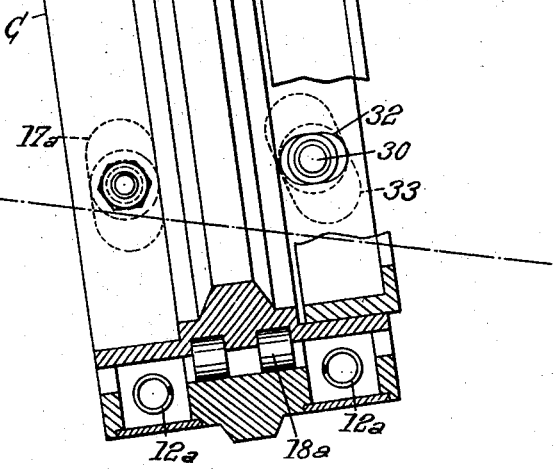

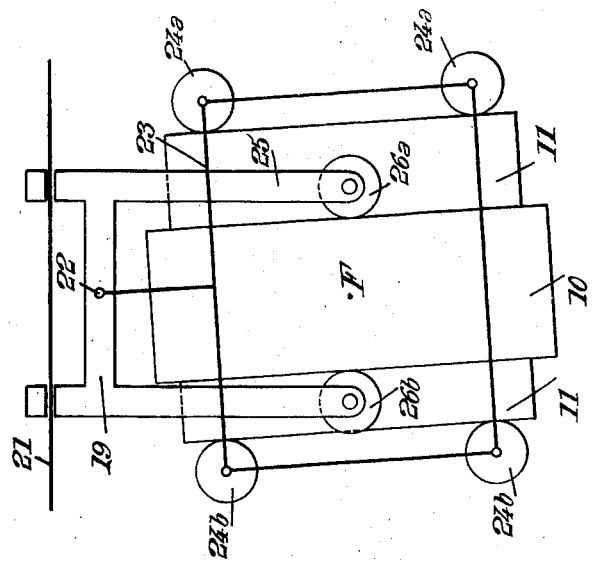
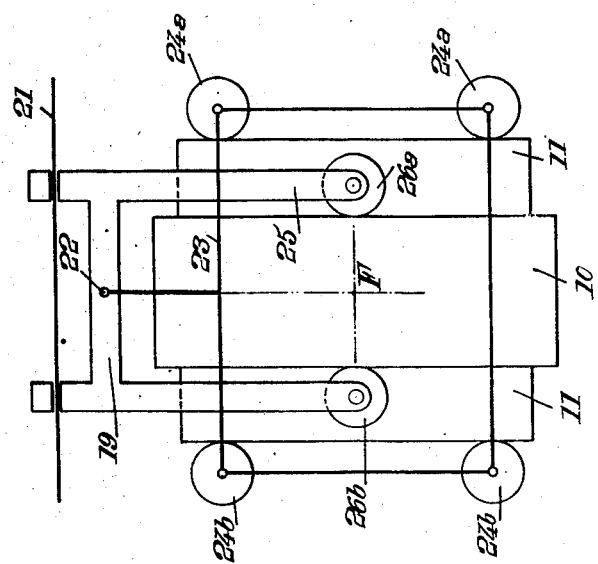

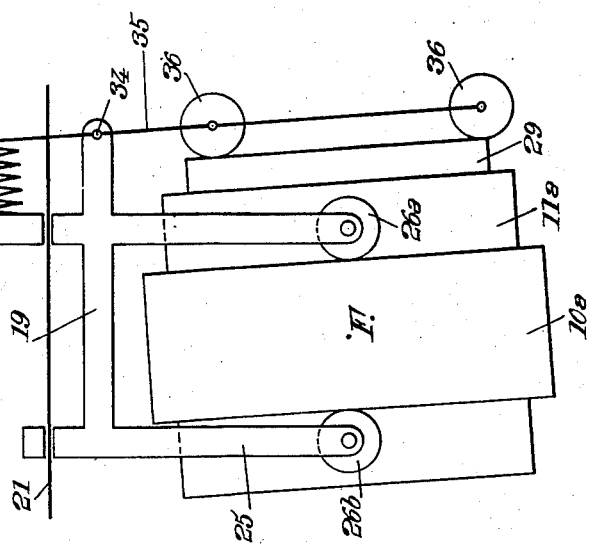
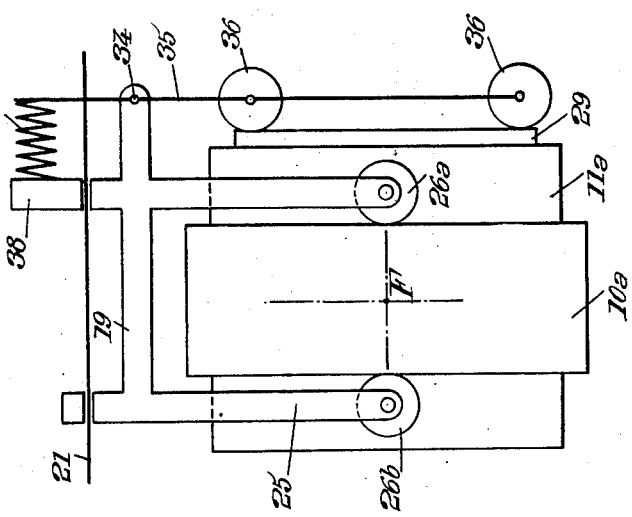

United States Patent Office 2,865,213
Patented Dec. 23, 1958

2,865,213

CHANGE SPEED DEVICES

Jean Guillaume Pernollet, Paris, and Yvon Boyer, St. Maurice, France

Application May 17, 1955, Serial No. 509,030

Claims priority, application France May 20, 1954

7 Claims. (Cl. 74—193)

The present invention relates to change speed devices including two rotatable cones, to wit a driving one and a driven one, journalled in a common frame so as to have their respective axes located in the same plane, the two generatrices of said cones respectively which are closest to each other being parallel to each other, and the apexes of said cones extending in opposed directions, one of said cones driving the other through a ring structure disposed around one of said cones and contacting both of them along said two generatrices respectively.

It has already been proposed in our patent application Ser. No. 366,784, of July 8, 1953, now Patent No. 2,764,029 for "Improvements in change speed devices," to constitute said ring structure by an assembly including two coaxial ring elements having their common axis located normally in the common plane of the axes of said cones, one of said ring elements tangentially contacting the driving cone on one of the two above generatrices and the other ring element tangentially contacting the driven cone of the other of said two generatrices, said two ring elements being rotatable with respect to each other about their common axis against the action of resilient means interposed between them so as to tend to maintain them in a given angular position with respect to each other, one of said ring elements carrying a part movable axially with respect to the other ring element in response to a relative rotation of said ring element with respect to each other. Thus, relative variations of the driving torque and the resistant torque, applied to said two cones respectively, produce relative rotations of said two elements and therefore axial displacements of said part with respect to the second mentioned ring element, whereby the ring structure is given inclinations and translations capable of automatically restoring the balance between the driving and the resistant torques.

The object of our invention is to provide a change speed device of this kind which is better adapted to meet the requirements of practice.

For this purpose, said part and the second mentioned ring element are both pivoted to a member slidable in the frame of the device with a translatory movement in a direction parallel to said two generatrices, respectively about two distinct axes fixed with respect to said member and both parallel to the plane of said two generatrices and perpendicular to said two generatrices.

Other features of our invention will become apparent in the course of the following detailed description of some embodiments thereof, with reference to the accompanying drawings, given merely by way of example and in which.

Figure 1:
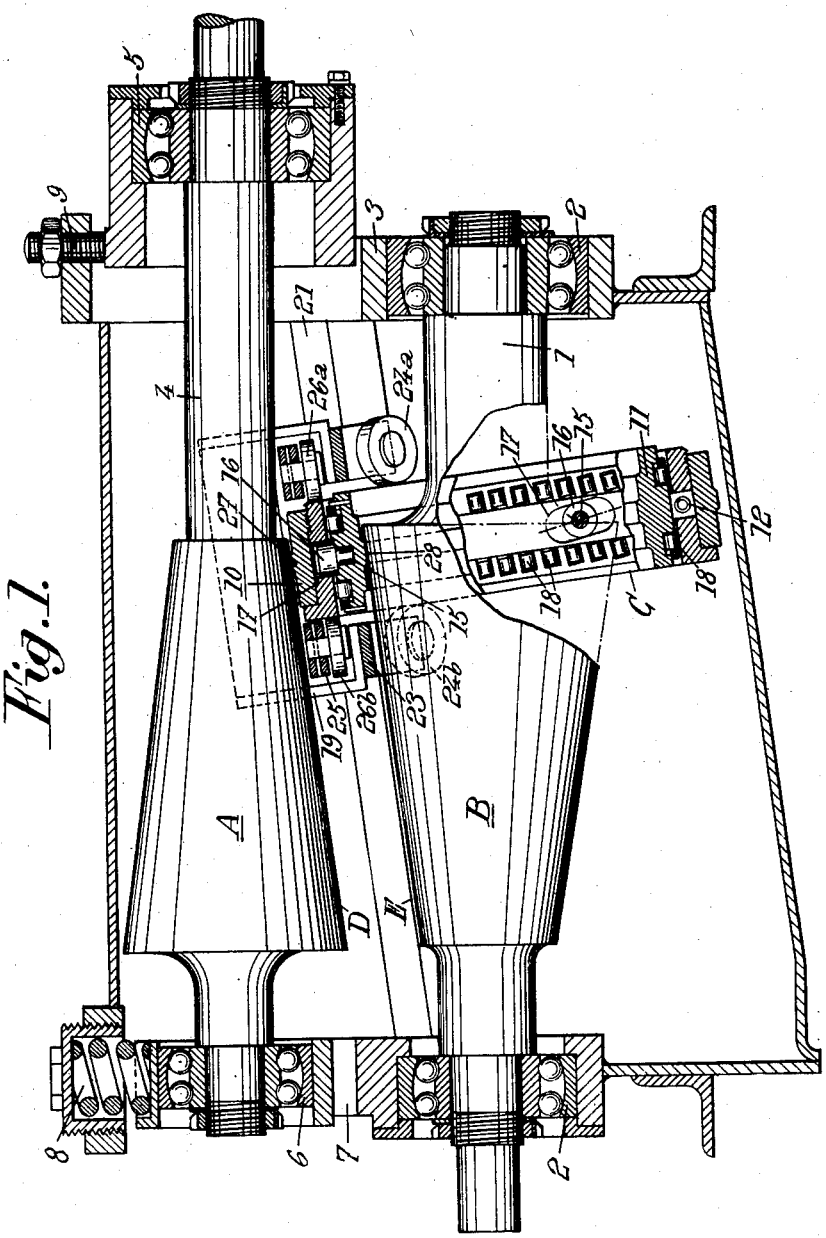
Fig. 1 is a longitudinal section, by a plane passing through the axes of the two cones, of a change speed device made according to a first embodiment of our invention.
Figure 1A:
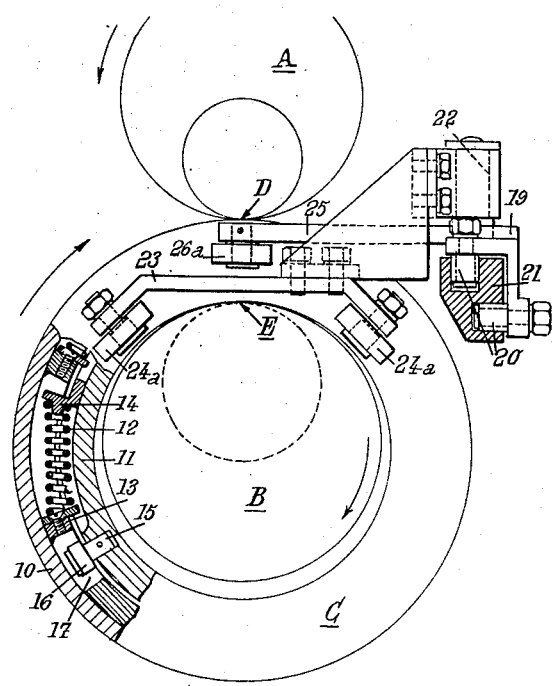
Fig. 1a is a side view with parts in cross section of said device seen from a direction parallel to the axes of the two cones.

Figs. 2 and 3 are diagrammatical views illustrating the operation of the change speed device of Figs. 1 and 1a, the two diagrammatical views of Figs. 2 and 3 being substantially plan views seen from the top, the cones being not shown.

Fig. 4 shows on an enlarged scale the ring structure of a change speed device made according to a modification.

Figs. 5 and 6 are diagrammatical views corresponding respectively to Figs. 2 and 3 and relative to the construction of Fig. 4.

The general construction of a change speed device according to our invention is shown by Figs. 1 and 1a. Such a change speed device includes two rotatable cones A and B, having their respective axes located in the same plane and their apexes extending in opposed directions. One of these cones, to wit A, drives the other one, to wit B, through a ring structure C surrounding cone B.

The shaft 1 of cone B is carried by two bearings 2, fixed in the frame 3 of the change speed device. The shaft 4 of cone A is carried on one side by a swivel bearing 5 the cage of which is fixed in the frame and the centre of which coincides at least approximately with the apex of said cone A and on the other side, shaft 4 is carried by a bearing 6 the cage of which is slidable in a guiding housing 7 provided in frame 3 so as to maintain said shaft constantly in the plane determined by shaft 1 and the centre of bearing 5. A spring 8 urges cone A toward cone B so that ring structure C is constantly held between said two cones with a sufficient pressure. Generatrices D and E along which the ring structure contacts cones A and B respectively, are parallel to each other and located in the plane of the axes of shafts 1 and 4.

Concerning the transmission ring structure C, it will first be supposed to be essentially constituted by two axial ring elements, to wit an external ring element 10 tangentially contacting cone A, and an internal ring element 11 tangentially contacting cone B.

These two ring elements are provided with cooperating guiding mens enabling them to have with respect to each other helical displacements about their common axis under the effect of relative variations of the driving and resistant torques. Springs 12, having their respective ends fixed to lugs 13 and 14 respectively carried by ring elements 10 and 11, tend to maintain said ring elements in a given angular position with respect to each other about their common axis. Ring element 11 carries radial fingers 15 advantageously provided with rollers 16, engaged in oblique slots 17 provided in the external ring element 10. Said fingers and slots are so disposed around the periphery of the ring elements that the respective middle planes of the ring elements are constantly maintained parallel to each other. Rollers 18 are interposed between the ring elements so as to facilitate their relative displacements.

The axes of the rollers 18 might be parallel to the common axis of the two ring elements. However, account should be taken of the fact that the two ring elements have helical displacements with respect to each other so that there is a component of their movement which is in the direction of their common axis. Rollers having their axes parallel to said common axis would not facilitate relative displacements of the ring elements along this component parallel to the direction of said axis. Therefore, advantageously, according to our invention, rollers 18 have their axes perpendicular to the direction of the relative displacements of the ring elements 10 and 11 with respect to each other. Thus, the rollers 18 disposed on either side of slots 17 provided in ring element 10 have their axes parallel to the middle line of this slot 17 as visible on Fig. 1. All the other rollers 18 are similarly disposed with respect to the ring elements.

The essential feature of our invention consists in providing ring elements 10 and 11 with guiding means such that in any position of ring structure C, the two ring elements 10 and 11 thereof are pivotable about two distinct axes respectively, both parallel to the plane containing generatrices D and E along which said ring elements contact cones A and B respectively, said two axes being perpendicular to said generatrices D and E.

Advantageously, one of said two pivot axes is located in said plane common to generatrices D and E. Preferably, these two axes are located, when the ring structure is perpendicular to generatrices D and E, in the middle plane of said ring structure.

The device illustrated by the drawings includes a carriage 19 freely slidable, with the interposition of rollers 20, on a fixed bar 21 parallel to generatrices D and E.

A rigid structure 23 pivoted to carriage 19 about an axis 22 (Fig. 1a) carries two sets of rollers 24a and 24b bearing against the end or side faces of the inner ring element 11.

A structure 25 rigid with carriage 19 carries two rollers 26a and 26b which bear respectively on the end or side faces of the outer ring element 10.

Thus, the inner ring element 11 is pivotable about axis 22 fixed with respect to carriage 19, whereas the outer ring element 10, which is coaxial with ring element 11, is so guided by rollers 26a and 26b that it is pivotable about an axis F (Figs. 2 and 3) parallel to the axes of rollers 26a and 26b and at mid-distance between them, this axis F being therefore, like axis 22, fixed with respect to carriage 19.

The operation of this change speed device is illustrated by Figs. 2 and 3.

It will be supposed that initially the ring structure is in a position such as shown by Fig. 1 where ring elements 10 and 11 have their middle planes in coincidence and at right angles to the direction of bar 21, that is to say to generatrices D and E.

When the driving and resistant torques cease to balance each other, the two ring elements 10 and 11 are caused to rotate with respect to each other about their common axis against the action of spring 12, and, due to the provision of slots 17 and fingers 15, this causes these two ring elements to move axially with respect to each other. This axial displacement causes a pivoting of the ensemble about an axis very close to F and practically coinciding with the same, since said axis F moves imperceptibly continually and at every moment due to the longitudinal mobility of axis 22. Ring structure C is therefore finally tilted about an axis perpendicular to generatrices D and E, and this movement causes a displacement of the ring structure along the generatrices D and E due to the rotation of cones A and B, and in the direction which corresponds to restoring the balance between the driving and resistant torques.

It should be noted that the change speed device works as above described only for given directions of rotation of cones A and B. When the cones are driven in opposed directions, ring structure C is automatically brought into the position corresponding to the highest reduction, which is particularly interesting in the case where the change speed device is applied to an automobile vehicle or similar machine. In this case, the change speed device in frontward drive achieves a balancing of the driving and resistant torques and, in the rearward drive, it establishes the minimum ratio of transmission of the device.

It should also be noted that, as the inclinations of the ring structure take place exclusively about an axis at right angles to generatrices D and E, it is possible to give the surfaces 27 and 28 of contact of the ring elements on the cone, a cylindrical shape. The pressure with which the ring elements are applied on the cone thus ensures a good position of the ring structure on the cones.

In what precedes it has been supposed that the ring structure C was essentially constituted by two ring elements 10 and 11 contacting respectively cones A and B and adapted to rotate and move axially with respect to each other.

Now in this case, a relative axial displacement of the outer and inner ring elements 10 and 11 necessarily causes sliding of their contact surfaces 27, 28 on the surfaces of cones A and B in a direction parallel to generatrices D and E, and therefore under pressures which may be very high according to the value of the torque that is transmitted by the change speed device.

This slipping can be eliminated by constituting the ring structure C by two coaxial ring elements, respectively an inner one and an outer one, which are respectively in contact with the two cones A and B and may roll thereon without having an axial relative displacement with respect to each other, these two ring elements serving to transmit torque from one cone to the other, the device further including in this case an auxiliary part mounted out of contact with said cones and connected in such manner with the two ring elements that a relative rotation of these elements with respect to each other causes said part to have an axial displacement with respect to both of them which may be used as in the above case to restore balance between the driving and resistant torques.

Such an arrangement is illustrated by Fig. 4. In this case, we make use of an outer ring 10a and an inner ring 11a between which are interposed rollers 18a the axes of which are parallel to the common axis of the two ring elements. These ring elements are guided with respect to each other by fingers 15a rigid with the inner ring element 11a and carrying rollers 16a engaged in slots 17a provided in the outer ring element 10a, these slots 17a being in this case parallel to the middle plane of the outer ring element 10a.

The ring structure further includes an auxiliary part 29 advantageously in the form of a ring element as illustrated by the drawings and disposed coaxially with respect to ring elements 10a and 11a, this auxiliary ring element being out of contact with the generatrices D and E of cones A and B. This auxiliary ring element 29 carries fingers 30, for instance three of them, carrying rollers 31 engaged in slots 32 provided in the inner ring element and disposed in a diametral plane of the ring and, on the other hand, in oblique slots 33 provided in the outer ring element 10a. Thus, auxiliary ring element 29 can move axially without turning with respect to the inner ring element 11a, but it may move both axially and angularly with respect to the outer ring element 10a. Thus, a relative rotation of ring elements 10a and 11a produced by a compression of the two sets of springs 12a interposed between ring elements 10a and 11a, that is to say resulting from a relative variation of the driving and resistant torques, produces an axial displacement of the auxiliary ring element 29 with respect to the whole of the ring elements 10a and 11a.

The change speed device includes a carriage 19 analogous to that above described with reference to the first mentioned embodiment, a bar 21, a rigid structure 25 with a pair of rollers 26a and 26b corresponding to the provision of an axis F, still as in the embodiment of Figs. 1 to 3. Carriage 19 further carries, pivotable about an axis 34, a lever 35 which is provided on the side of axis 34 with rollers 36 running against the end or side face of the auxiliary ring element 29. Furthermore, a compression spring 37 is interposed between said lever and an arm 38 rigid with carriage 19.

We thus obtain a change speed device the operation of which is analogous to that of the device of Figs. 1 and 1a and illustrated by Figs. 2 and 3. In the second mentioned embodiment which has just been described, the action of the outer ring element 10 of Figs. 2 and 3 is replaced by that of the whole of ring elements 10a and 11a pivoted about axis F (Figs. 5 and 6), and the auxiliary ring element 29 thus plays the same part as the inner ring element 11 of the embodiment of Figs. 2 and 3. This auxiliary ring element 29 may be considered as being pivoted about axis 34 owing to the fact that lever 35 remains constantly parallel to the side or end face of said auxiliary ring element 29 due to the permanent application of rollers 36 thereon under the action of spring 37.

However, the embodiment of Figs. 4, 5 and 6 has, with respect to that of Figs. 1, 2 and 3, the advantage that the two main ring elements which transmit torque are not compelled to slide axially along the generatrices D and E of cones A and B during operation, which permits of obtaining a higher strength of the device and a higher safety of operation for the change speed device, and also an instantaneous response of the apparatus to relative variations of the driving and resistant torques.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A change speed device which comprises, in combination, a frame, a driven cone and a driving cone journalled in said frame about their respective axes, said axes being located in the same plane and the respective generatrices of said cones located in this plane and nearest to each other being parallel, the apexes of said cones extending in opposed directions, a driving ring structure passing around one of said members and caught between said two generatrices to transmit torque from said driving member to said driven member with a transmission ratio variable in accordance with the position of said ring structure along said two generatrices, said ring structure including two coaxial ring elements movable with respect to each other by relative rotation about their common axis, a part carried by one of said ring elements and movable axially with respect to the other in response to relative rotation of said two ring elements with respect to each other, a member slidable in said frame with a translatory movement in a direction parallel to said two generatrices, and means for pivotably connecting said other ring element and said part with said member, so that said two coaxial ring elements can pivot simultaneously about a determinable axis parallel to the plane of said two generatrices and perpendicular to said two generatrices.

2. A change speed device according to claim 1 in which said determinable axis is located in the common plane of the respective cone axes.

3. A change speed device which comprises, in combination, a frame, a driven cone and a driving cone journalled in said frame about their respective axes, said axes being located in the same plane and the respective generatrices of said cones located in this plane and nearest to each other being parallel, the apexes of said cones extending in opposed directions, a driving ring structure passing around one of said members and caught between said two generatrices to transmit torque from said driving member to said driven member with a transmission ratio variable in accordance with the position of said ring structure along said two generatrices, said ring structure including two coaxial ring elements movable with respect to each other by relative rotation about their common axis and also movable axially with respect to each other in response to relative rotation between them, a member slidable in said frame with a translatory movement in a direction parallel to said two generatrices, and means for pivotably connecting said two ring elements so that said two coaxial ring elements can pivot simultaneously about a determinable axis parallel to the plane of said two generatrices and perpendicular to said two generatrices.

4. A change speed device according to claim 3 in which one of said two ring elements is provided with guiding slots oblique with respect to the middle plane of said last mentioned ring element, said device further including fingers rigid with the other ring element and engaged in said slots.

5. A change speed device according to claim 4, further including rollers interposed between said two ring elements, the axes of these rollers being perpendicular to said slots provided in one of said ring elements.

6. A change speed device which comprises, in combination, a frame, a driven cone and a driving cone journalled in said frame about their respective axes, said axes being located in the same plane and the respective generatrices of said cones located in this plane and nearest to each other being parallel, the apexes of said cones extending in opposed directions, a driving ring structure passing around one of said members and caught between said two generatrices to transmit torque from said driving member to said driven member with a transmission ratio variable in accordance with the position of said ring structure along said two generatrices, said ring structure including two coaxial main ring elements movable with respect to each other by relative rotation about their common axis but mounted to have no possible relative axial displacement with respect to each other, an auxiliary ring element carried by one of said main ring elements coaxially therewith and axially slidable with respect thereto without being able to rotate with respect thereto, means for moving said auxiliary ring element axially with respect to said two main ring elements in response to relative rotation of said two main ring elements with respect to each other, a member slidable in said frame with a translatory movement in a direction parallel to said two generatrices, and means for pivotally connecting said other main ring element and said auxiliary ring element with said member, so that said two coaxial ring elements can pivot simultaneously about a determinable axis parallel to the plane of said two generatrices and perpendicular to said two generatrices.

7. A change speed device according to claim 6 in which said means for moving said auxiliary ring element axially wtih respect to said two main ring elements include guiding fingers rigid with said auxiliary ring element, said two main ring elements being provided with respective slots to accommodate said fingers, said slots being oblique to the common axis of said ring elements for at least one of said main ring elements.

References Cited in the file of this patent
UNITED STATES PATENTS

| 2,205,031 | Bugden | June 18, 1940 |
| 2,583,790 | Mikina | Jan. 29, 1952 |
| 2,659,245 | McLaren | Nov. 17, 1953 |
| 2,764,029 | Pernollet et al. | Sept. 25, 1956 |

FOREIGN PATENTS

| 1,011,229 | France | Apr. 2, 1952 |